V. SCHLEYER.
DEEP WELL PUMP LUBRICATION.
APPLICATION FILED OCT. 30, 1920.
1,405,380.
Patented Jan. 31, 1922.
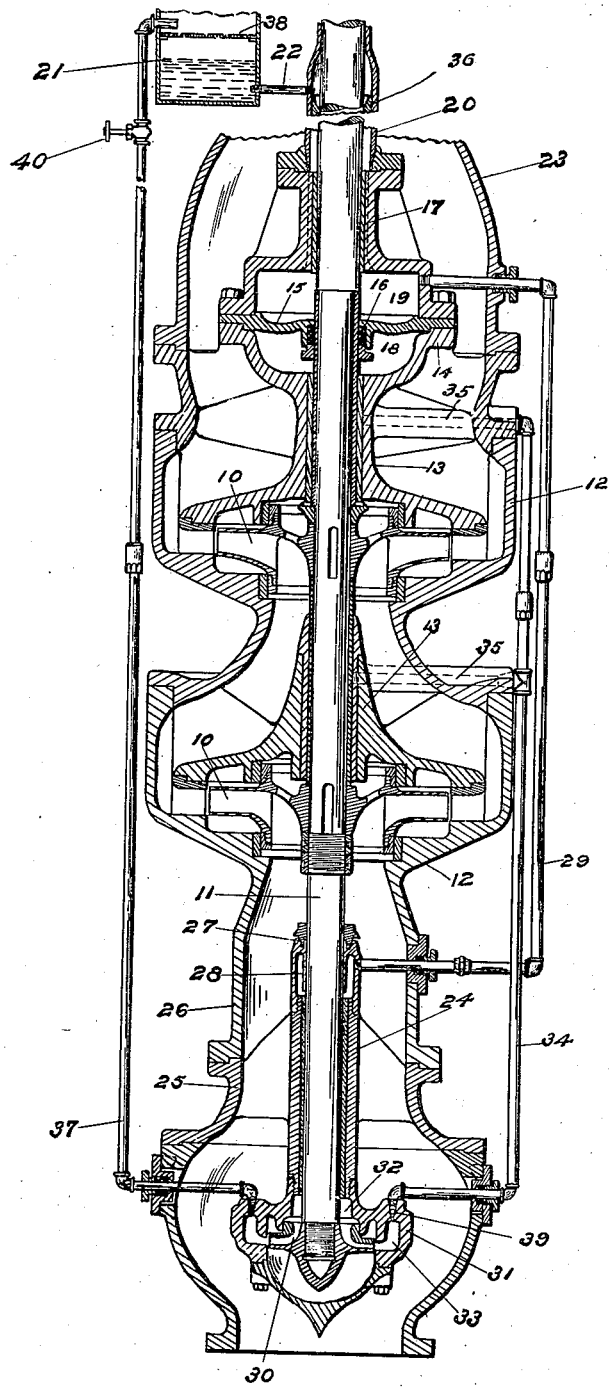
Inventor
VICTOR SCHLEYER
By Hood & Schley
Attorneys

UNITED STATES PATENT OFFICE.

VICTOR SCHLEYER, OF ANDERSON, INDIANA, ASSIGNOR TO MIDWEST ENGINE COMPANY, OF INDIANAPOLIS, INDIANA, A CORPORATION OF INDIANA.

DEEP-WELL-PUMP LUBRICATION.

1,405,380.   Specification of Letters Patent.   Patented Jan. 31, 1922.

Application filed October 30, 1920. Serial No. 420,695.

*To all whom it may concern:*

Be it known that I, VICTOR SCHLEYER, a citizen of the United States, residing at Anderson, in the county of Madison and State of Indiana, have invented a new and useful Deep-Well-Pump Lubrication, of which the following is a specification.

It is the object of my invention to provide an efficient lubricating system for deep-well pumps.

The accompanying drawing illustrates my invention: The single figure of such drawing is a vertical central section through a deep-well pump embodying my invention, showing only a fragment of the upper part of the structure.

The pump shown is a multi-stage pump, having a plurality of runners 10 mounted on a shaft 11 which extends down into the pump from the top of the well where it is provided with any suitable driving means. The pump has the usual casing 12 around the runners 10, and the usual bearings 13, of any desired type, one above each of the runners 10. The upper bearing 13 has an annular flange 14 at its upper end, on which is a plate 15 which has a stuffing box 16 around the shaft 11; and upon the plate 15 rests the footing of a bearing 17 for the shaft 11. The plate 15 separates spaces 18 and 19 below and above it, and the flange 14, the edge of the plate 15, and the footing of the bearing 17 are bolted together by suitable clamping bolts. From the top of the bearing 17 a pipe 20 surrounding the shaft 11 extends upward to the top of the well, to provide a lubricant-passage around the shaft from a supply tank 21, which is connected by a pipe 22 to the pipe 20 near its upper end.
The pipe 20 and shaft 11 extend centrally of the water-discharge pipe 23 leading up from the pump.

Below the lower runner 10 the shaft 11 is provided with a tail bearing 24, suitably supported by a spider 25 from the inlet casing 26 of the pump. At the upper end of the tail bearing 24 is a joint 27 as nearly water tight as possible with the shaft 11, and near such upper end is an annular chamber 28 which is connected by a pipe 29 to the space 19 between the plate 15 and the bearing 17. On the extreme bottom end of the shaft 11 is the runner 30 of a small lubricant pump, mounted in a casing 31 supported from the bearing 24. The intake of the runner 30 opens to a chamber 32 at the lower end of the bearing 24. The runner discharges outwardly by centrifugal force into a discharge chamber 33 in the casing 31, which discharge chamber is connected by a pipe 34 to a plurality of ducts 35 leading respectively to the several pump bearings 13. The discharge chamber 33 is also connected by a pipe 37 to the tank 21, preferably discharging into such tank above a screen 38 therein, while the pipe 22 leads from the tank 21 below such screen, so that the screen filters the lubricant which flows out from the tank. The entrance from the discharge chamber 33 of the lubricant pump to the pipe 34 is preferably smaller than that to the pipe 37, so that the greater part of the lubricant discharged from the lubricating pump will be returned to the tank 21; and in the entrance to the pipe 34 from the chamber 33 I preferably provide a check valve 39 which prevents the possibility of back flow of any liquid from the pipe 34 into such discharge chamber 33. Preferably I provide a hand valve 40 in the pipe 37, usually at the upper end thereof, by the manipulation of which hand valve the relative amounts of lubricant discharged through the pipes 34 and 37 may be controlled.

In operation, the lubricant from the tank 21, which is kept filled, is supplied by the pipe 22 to the shaft-surrounding pipe 20, whence it is fed downward, past any bearing 36 which may be provided within said pipe 20 for the shaft, to and through the bearing 17 and into the space 19. Thence it passes by the pipe 29 to the chamber 28, and through the bearing 24 to the space 32. From this space 32 it is drawn by the sucking action of the runner 30 and thrown into the discharge chamber 33, and fed therefrom by way of the pipe 37 back to the tank 21 and by way of the pipe 34 and ducts 35 to and through the pump bearings 13. Thus the pump bearings 13 are positively lubricated, by forced pressure, which pressure is sufficiently great to prevent water and sand from entering such bearings. The flow of lubricant through the pump bearings may be relatively small, if that is desired, to avoid contamination of the water pumped upward by the pump in case the lubricant used is oil; and water is prevented from entering the lubricant pump by the action of the check valve 39,

I claim as my invention:

1. In a deep-well pump, the combination of a shaft extending down into the well, a pump having one or more runners mounted on said shaft and one or more bearings for said shaft, a water-discharge pipe extending upward from said pump around said shaft, a smaller pipe surrounding said shaft within said water-discharge pipe and supplied with lubricant at the top, a tail bearing around the lower end of said shaft below the pump runners, a lubricant pump having a runner on the lower end of said shaft below the runners of the main pump and below said tail bearing, connections from the outlet of said lubricant pump to the bearing or bearings of said main pump, and connections from the lower end of said smaller shaft-surrounding pipe through said tail bearing to the intake of said lubricant pump.

2. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a tail bearing around the lower end of said shaft below the pump runners, a lubricant pump having a runner on the lower end of said shaft below the runners of the main pump and below said tail bearing, connections from the outlet of said lubricant pump to the bearing or bearings of said main pump, and connections from the lower end of said shaft-surrounding pipe through said tail bearing to the intake of said lubricant pump.

3. In a deep-well pump, the combination of a shaft extending down into the well, a pump having one or more runners mounted on said shaft and one or more bearings for said shaft, a water-discharge pipe extending upward from said pump around said shaft, a smaller pipe surrounding said shaft within said water-discharge pipe and supplied with lubricant at the top, a lubricant pump having a runner on the lower end of said shaft below the runners of the main pump, connections from the outlet of said lubricant pump to the bearing or bearings of said main pump, and connections from the lower end of said smaller shaft-surrounding pipe to the intake of said lubricant pump.

4. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a lubricant pump having a runner on the lower end of said shaft below the runners of the main pump, connections from the outlet of said lubricant pump to the bearing or bearings of said main pump, and connections from the lower end of said shaft-surrounding pipe to the intake of said lubricant pump.

5. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a lubricant pump having a runner on the lower end of said shaft below the runners of the main pump, and connections from the lower end of said shaft-surrounding pipe to the intake of said lubricant pump.

6. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a tail bearing around the lower end of said shaft below the pump runners, a lubricant pump having a runner on the lower end of said shaft below the runners of the main pump and below said tail bearing, and connections from the lower end of said shaft-surrounding pipe through said tail bearing to the intake of said lubricant pump.

7. In a deep-well pump, the combination of a shaft extending down into the well, a pump having one or more runners mounted on said shaft and one or more bearings for said shaft, a water-discharge pipe extending upward from said pump around said shaft, a smaller pipe surrounding said shaft within said water-discharge pipe and supplied with lubricant at the top, a lubricant pump having a runner on the lower end of said shaft below the runners of the main pump, and connections from the lower end of said smaller shaft-surrounding pipe to the intake of said lubricant pump.

8. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a lubricant pump having a runner on the lower end of said shaft below the runners of the main pump, connections from the lower end of said shaft-surrounding pipe to the intake of said lubricant pump, a lubricant tank which is connected to the upper end of said shaft-surrounding pipe to supply lubricant thereto, and connections from the outlet of said lubricant pump to said tank.

9. In a deep-well pump, the combination of a shaft extending down into the well, a pump having one or more runners mounted on said shaft and one or more bearings for said shaft, a water-discharge pipe extending upward from said pump, a pipe surrounding said shaft and supplied with lubricant at the top, a lubricant pump having a runner on the lower end of said shaft below the runners of the main pump, connections from the lower end of said shaft-surrounding pipe to the intake of said lubricant pump, a lubricant tank which is connected to the upper end of said shaft-surrounding pipe to supply lubricant thereto, and the connections leading from the outlet of said lubricant pump both to the bearing or bearings of said main pump and to said tank.

In witness whereof, I have hereunto set my hand at Anderson, Indiana, this 26th day of October, A. D. one thousand nine hundred and twenty.

VICTOR SCHLEYER.